United States Patent

Fauth

[11] 4,210,392
[45] Jul. 1, 1980

[54] PHOTOGRAPHIC APPARATUS

[75] Inventor: Günter Fauth, Unterhaching, Fed. Rep. of Germany

[73] Assignee: AGFA-Gevaert Aktiengesellschaft, Leverkusen, Fed. Rep. of Germany

[21] Appl. No.: 969,152

[22] Filed: Dec. 13, 1978

Related U.S. Application Data

[63] Continuation of Ser. No. 783,344, Mar. 31, 1977, abandoned.

[30] Foreign Application Priority Data

Apr. 3, 1976 [DE] Fed. Rep. of Germany ....... 2614527

[51] Int. Cl.$^2$ .............................................. G03B 7/00
[52] U.S. Cl. ................................................... 354/21
[58] Field of Search ...................... 354/21, 174, 275; 352/78 C

[56] References Cited

U.S. PATENT DOCUMENTS

| | | | |
|---|---|---|---|
| 3,495,901 | 2/1970 | Neudecker et al. | 354/21 X |
| 3,667,362 | 6/1972 | Neudecker et al. | 354/21 |
| 3,738,244 | 6/1973 | Leistner | 354/21 |
| 4,000,497 | 12/1976 | Galbraith, Jr. | 354/21 |
| 4,003,062 | 1/1977 | Galbraith, Jr. | 354/21 |
| 4,055,846 | 10/1977 | Yamanaka et al. | 354/21 |

Primary Examiner—Michael L. Gellner
Attorney, Agent, or Firm—Peter K. Kontler

[57] ABSTRACT

A photographic apparatus which can accept cassettes having markers denoting different film speeds. When a cassette having a particular marker is inserted into the housing, it displaces a spring-biased scanning lever which thereby allows or prevents a filter to move into register with the picture taking lens. Complete closing of the door for the film chamber results in engagement of the scanning lever with a displacing lever which moves the scanning lever slightly away from the marker so that the scanning lever cannot interfere with proper orientation of the cassette in the housing. Alternatively, the scanning lever can be disengaged from the marker by a film transporting or shutter actuating member which engages the scanning lever with another lever to thereby hold the scanning lever out of contact with the marker.

7 Claims, 5 Drawing Figures

PHOTOGRAPHIC APPARATUS

This is a continuation of application Ser. No. 783,344, filed Mar. 31, 1977, now abandoned.

BACKGROUND OF THE INVENTION

The present invention relates to photographic apparatus in general, especially to still cameras, and more particularly to improvements in photographic apparatus of the type which can accept different types of films and are provided with means for automatically compensating for different characteristics of photographic films, especially for different sensitivities or speeds of films.

It is known to provide cassettes or analogous containers for photographic film with indices or markers which designate the speed or sensitivity of film in the container. A marker may constitute a protuberance, a notch, a notch and a protuberance, the absence of a notch or the absence of a protuberance. A camera which utilizes such containers is provided with spring-biased scanning means (e.g., a lever, a slide or an analogous sensor) which bears against the marker of a properly inserted container and thereby automatically sets the camera for operation with the selected type of film. For example, the scanning means can move (or can allow the movement of) a filter behind the picture taking lens when the camera is loaded with film having a first sensitivity, and the filter is moved (or allowed to move) out of register with the lens when the camera contains film having a different second sensitivity.

A drawback of the just described photographic apparatus is that the force with which the scanning means bears against the index or marker of a container is likely to move the container from a predetermined optimum position, i.e., successive foremost unexposed film frames are not always located in a predetermined film plane at an optimum distance from the picture taking lens. This results in the making of unsatisfactory exposures.

OBJECTS AND SUMMARY OF THE INVENTION

An object of the invention is to provide a photographic apparatus wherein the means for scanning the markers of cassettes or analogous containers for photographic film cannot adversely influence the position of a properly inserted container when the apparatus is ready for the marking of exposures.

Another object of the invention is to provide an apparatus of the just outlined character wherein a properly inserted film container is subjected only to the action of such forces which tend to maintain successive foremost unexposed film frames in an optimum position with respect to the picture taking lens.

A further object of the invention is to provide novel and improved means for disengaging the scanning means from a properly inserted film container not later than when the apparatus is ready to make the first exposure.

An additional object of the invention is to provide a photographic apparatus (which may constitute a still camera or a motion picture camera) which can accept commercially available film containers.

The invention is embodied a photographic apparatus for use with film containers having markers denoting a characteristic (e.g., the sensitivity) of the film therein. The apparatus comprises a housing including a section having a chamber for film containers, mobile scanning means (e.g., a spring-biased lever) mounted in the housing and located in the path of movement of a marker during insertion of the respective container into the chamber so that the scanning means is moved by and bears against the marker in response to insertion of such container, and means for disengaging the scanning means from the marker of a container in the chamber. The disengaging means includes a member (e.g., a spring-biased lever) a movable section or a door which forms part of the housing and is pivotable between open and closed positions to respectively afford access to and seal the chamber, and/or a reciprocable member which forms part of the film transporting or shutter actuating means which is movable between first and second positions to thereby effect the disengagement of scanning means from the marker during movement from the one to the other position thereof.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
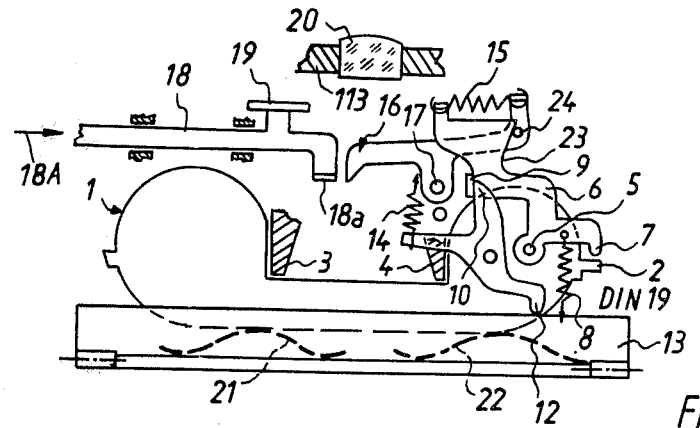
FIG. 2 illustrates the structure of FIG. 1 but with the movable section in the operative position.
Figure 1:
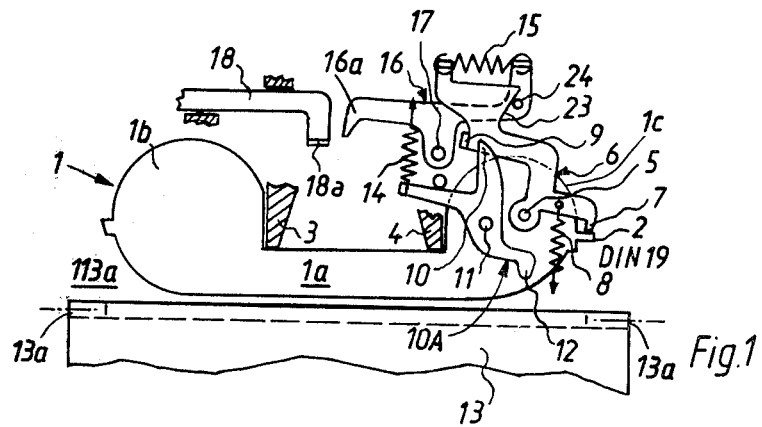
FIG. 1 is a fragmentary sectional view of a still camera which embodies one form of the invention, the movable section of the housing being shown in the inoperative position.

Referring to FIGS. 1 and 2, there is shown a still camera which comprises a housing or body including a main section having two portions 3 and 4 which define a window for scene light. When the shutter (not shown) of the still camera is open, scene light can pass through a picture taking lens 20 which is installed in the front wall 113 of the main section of the housing and through the window between the portions 3, 4 to reach the foremost unexposed film frame in a cassette 1. The latter is inserted into a chamber 113a (which is defined by the main section of the housing) so that its bridge-like median part 1a abuts against the portions 3, 4. The part 1b of the cassette 1 contains a roll of unexposed film and the part 1c serves to collect exposed film, or vice versa. The outer side of the part 1c is provided with a protuberance 2 which constitutes an index or marker denoting that the cassette 1 contains a particular type of photographic film (e.g., DIN 19 or the corresponding American Standard value) having a given sensitivity or speed.

The main section of the housing contains a scanning lever or sensor 6 which is pivotably mounted in the main section, as at 5, and has an arm 7 which bears against the marker 2 when the part 1a of the cassette 1 abuts against the portions 3, 4 and the mobile second section 13 of the camera housing is held in the open or first position of FIG. 1. The second section 13 constitutes a door or closure for the chamber 113a. The lever 6 is biased clockwise, as viewed in FIGS. 1 and 2, by a helical spring 8. A second arm of the lever 6 has a suitably bent projection or lug 9 which is located in the path of movement of the portion or arm 10 of a displaceable disengaging lever 10A. The latter is pivotable on a pin 11 of the main housing section and is biased clockwise, as viewed in FIGS. 1-2, by a helical spring 14. A second portion or arm 12 of the disengaging lever 10A extends into the path of movement of the door 13 from the open position of FIG. 1 to the closed or second position of FIG. 2. When the door 13 is closed, it pivots the disengaging lever 10A from the position of FIG. 1 to the position of FIG. 2 whereby the arm 10 bears against the lug 9 and disengages the arm 7 from the marker 2.

The lever 6 is coupled with an arresting lever 16 by a helical spring 15. The lever 16 is pivotable on a pin 17 of the main housing section and has a pin-shaped follower 24 tracking a suitably configurated cam face or edge face 23 of the lever 6. When the door 13 is locked in the closed position of FIG. 2 (whereby two leaf springs 21, 22 of the door bear against the rear side of the cassette 1 and urge the part 1a against the portions 3, 4 of the main housing section), the cam face 23 of the lever 6 maintains the arm 16a of the arresting lever 16 in the path of movement of the suitably configurated end portion 18a of a reciprocable carrier 18 for a filter 19 (e.g., a grey filter or another light modulating or compensating filter of the type which should not be permitted to enter the space between the picture taking lens 20 and the foremost unexposed frame of photographic film in the cassette 1 when the camera is loaded with DIN 19 film).

The operation:

When the door 13 is held in the open position of FIG. 1 (this door is pivotally mounted on the main housing section by hinges 13a), a cassette 1 can be inserted into the chamber 113a of the main section so that its part 1a abuts against the portions 3 and 4. The arm 7 of the lever 6 bears against the marker 2 of the properly inserted cassette 1 with a force which is determined by the selected bias of the spring 8.

The user thereupon moves the door 13 to and locks it in the closed position of FIG. 2. This causes the leaf springs 21, 22 to bear against the rear side of the cassette 1 and to maintain the part 1a in contact with the portions 3, 4 of the main housing section. The arm 7 is automatically disengaged from the marker 2 because the closed door 13 maintains the disengaging lever 10A in the position of FIG. 2 in which the arm 10 engages the lug 9 and holds the tip of the arm 7 at a level slightly above the marker 2, as viewed in FIG. 2. Due to pivoting of the lever 6 from the position of FIG. 1 to the position of FIG. 2, this lever causes the spring 15 to move the arresting lever 16 to the position of FIG. 2 in which the arm 16a extends into the path of rightward movement of the end portion 18a of the carrier 18 for the filter 19. Therefore, the filter 19 cannot be placed between the lens 20 and the foremost unexposed film frame in the cassette 1. The carrier 18 is biased in a direction to the right, as viewed in FIG. 1 or 2, in response to depression or other mode of actuation of the camera release, not shown. The direction in which the carrier 18 is biased is indicated by arrow 18A. Since the arm 16a prevents the movement of filter 19 into register with the lens 20, the camera will make a satisfactory exposure because the filter is intended to compensate for a different film speed, i.e., not for the speed of a DIN 19 film.

An important advantage of the improved photographic apparatus is that the cassette 1 is not biased by the spring 8 (via arm 7 and marker 2) when the door 13 is held in the closed position of FIG. 2, i.e., when the apparatus is ready to make exposures. Therefore, the leaf springs 21, 22 can maintain the cassette 1 in an optimum position with respect to the lens 20 so that each and every unexposed frame of the film in the cassette 1 is invariably located in one and the same plane and at the same distance from the lens 20. Were the spring 8 free to bias the arm 7 against the marker 2 while the door 13 is closed, the spring 8 would be likely to oppose the bias of the spring 22 and the front side of the median part 1a of the cassette 1 would be out of contact with the portion 4 of the main housing section. In other words, the cassette would be likely to pivot with respect to the portion 3.

Another advantage of the improved photographic apparatus is that the marker 2 can be located at the front side of the cassette 1 or is at least accessible from the front side of the cassette. This simplifies the mounting and design of the scanning means. In certain presently known cameras, the position of the marker is selected in such a way that it must be engaged by the scanning means from behind in order to reduce the likelihood of improper orientation of the cassette under the bias of the scanning means. As a rule, the space which is available behind a properly inserted cassette is limited so that there is little room for mounting of scanning means in such a way that it can engage the marker from behind.

The extent to which the lever 10A moves the arm 7 away from the marker 2 can be extremely small; all that counts is to insure that the means which biases the lever 6 cannot influence the position of the cassette when the door 13 is closed. The rather small pivotal movement of the lever 6 from the position of FIG. 1 to the position of FIG. 2 in response to pivoting of the disengaging lever 10A during movement of the door 13 to closed position does not result in a pronounced change in angular position of the arresting lever 16, i.e., the arm 16a continues to extend into the path of movement of the end portion 18a of the carrier 18 and prevents a movement of the filter 19 behind the lens 20 when the user actuates the camera release.

Figure 3:
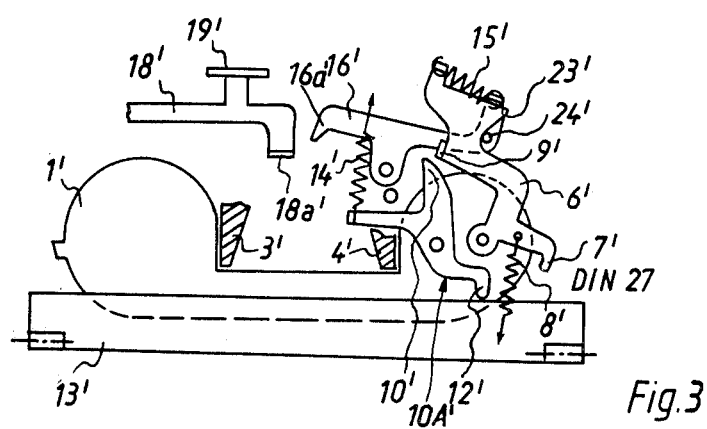
FIG. 3 illustrates the structure of FIG. 1, the cassette of FIGS. 1-2 being replaced with a cassette containing a different photographic film.

FIG. 3 shows the camera of FIGS. 1-2 with the door in closed position (the leaf springs 21, 22 are omitted) and with the picture taking lens omitted. The parts of the camera of FIG. 3 are designated by the reference characters used in FIGS. 1-2 but each followed by a prime. The cassette 1' of FIG. 3 is different from the cassette 1 because it does not have an index or marker; this denotes that the sensitivity of film in the cassette 1' is different from that of the film in the cassette 1. It is assumed that the cassette 1' contains DIN 27 film. Therefore, and since the spring 8' is free to bias the lever or sensor 6' clockwise beyond the position shown in FIG. 1 (for the lever 6), the lug 9' is not located in the path of movement of the arm 10' and, therefore, the closing of door 13' does not change the angular position of the lever 6' because, as the closing door 13' pivots the disengaging lever 10A' is a counterclockwise direction, as viewed in FIG. 3, the arm 10' bypasses the lug 9'.

Consequently, the spring 15' maintains the arresting lever 16' in a different angular position, namely in a position in which the arm 16a' does not interfere with rightward movement of the carrier 18' when the user actuates the camera release. The filter 19' is free to enter the space between the lens and the foremost unexposed film frame in the cassette 1'. This compensates for the difference between the sensitivities of films in the cassettes 1 and 1'. The arresting lever 16' is held in the ineffective or idle position of FIG. 3 by the spring 15' and the cam and follower unit 23', 24'. The angular position of the arresting lever 16' is fixed because the follower 24' extends into the deepmost portion of the cutout which is bounded by the cam face 23'. It will be noted that a motion transmitting connection between the levers 6, 10A or 6' and 10A' can be established only if the arm 7 or 7' bears against a marker on the properly inserted cassette (1) while the door moves to the closed position.

Figure 4:
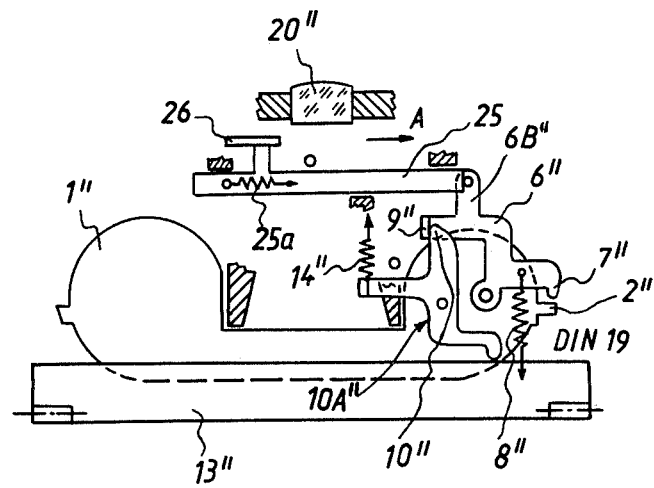
FIG. 4 is a fragmentary sectional view of a second still camera.

All such parts of the still camera of FIG. 4 which are identical with or clearly analogous to corresponding parts of the camera of FIGS. 1-2 are denoted by similar reference characters each followed by two primes. The camera of FIG. 4 constitutes a simplified version of the first camera because it dispenses with the arresting lever 16 or 16'. Instead, the scanning lever 6" comprises an arm or extension 6B' which is located in the path of rightward movement of the carrier 25 for a filter 26 when the lug 9" of the lever 6" is engaged by the arm 10" of the disengaging lever 10A" and the door 13" is held in the closed position, i.e., cassette 1" contains a DIN 19 film which can be properly exposed without interposition of the filter 26 between the lens 20" and the foremost unexposed film frame. The cassette 1" has a marker or index 2", i.e., the film therein is assumed to be identical with film which is stored in the cassette 1 of FIGS. 1-2.

If the cassette 1" is replaced with the cassette 1' of FIG. 3, the spring 8" pivots the lever 6" clockwise to a position in which the lug 9" is remote from the path of movement of the arm 10" (in response to closing of the door 13") and the arm or extension 6B" is remote from the path of movement of the carrier 25 so that the filter 26 can move behind the lens 20" when the user actuates the camera release. The reference character 25a denotes a spring which may be mounted to permanently bias the carrier 25 in a direction to the right (see the arrow A), i.e., so as to place the filter 26 behind the lens 20". This renders it unnecessary to couple the carrier 25 with the camera release because the filter 26 is normally held in the effective position behind the lens 20" and is moved to the retracted position of FIG. 4 only when the cassette 1" in the chamber of the main housing section is provided with a marker (2") denoting that the film therein can be properly exposed without a filter.

Figure 5:
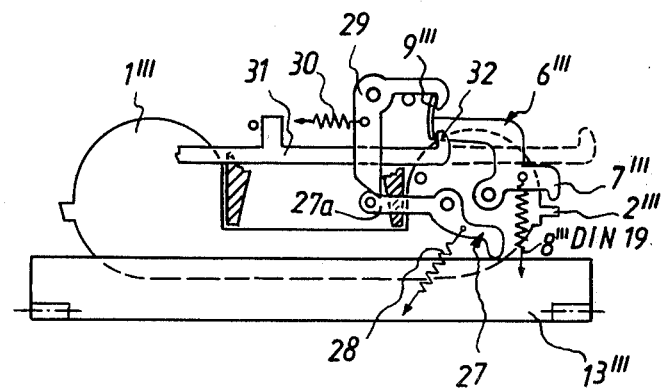
FIG. 5 is a fragmentary sectional view of a third still camera.

Referring to FIG. 5, all such components of the camera shown therein which are identical with or clearly analogous to corresponding components of the camera of FIGS. 1-2 are denoted by similar reference characters each followed by three primes. The cassette 1''' is assumed to be identical with the cassette 1 or 1", i.e., it has an index or marker 2''' and contains DIN 19 film. When the door 13''' is moved to the closed position of FIG. 5, it pivots a first lever 27 of a composite disengaging unit in a counterclockwise direction and thereby stresses a helical spring 28. Prior to pivoting of the lever 27 by the door 13''', the arm 27a of the lever 27 is located in the path of movement of a second lever 29 which forms part of the aforementioned disengaging unit and is biased clockwise, as viewed in FIG. 5, by a helical spring 30 weaker than the spring 28. When the door 13''' moves the lever 27 to the position of FIG. 5, the lever 29 is free to pivot clockwise and to move the pallet of its right-hand arm into engagement with the lug 9''' of the scanning lever 6'''. The lever 29 serves to hold the lever 6''' in the position of FIG. 5, i.e., in that position in which the arm 7''' is disengaged from the marker 2''' of a cassette 1''' which contains DIN 19 film. The means for bodily disengaging the arm 7''' from the marker 2''' includes a reciprocable member 31 which serves to cock the shutter (not shown) in response to transport of photographic film by the length of a frame. Of course, the member 31 may also constitute a component of the film transporting mechanism. All that counts is to provide a member which is reciprocable or otherwise movable in the housing of the camera and is moved in a direction to disengage the arm 7''' from the marker 2''' before the user actuates the release to make the first exposure. This insures that the lever 6''' is moved to the illustrated angular position in which the lug 9''' can be engaged and held by the pallet of the lever 29. The member 31 is reciprocable between the positions which are respectively shown by solid and broken lines. The hooked portion 32 of the member 31 is configurated in such a way that it engages the lug 9''' and pivots the lever 6''' from a position in which the arm 7''' bears against the marker 2''' to the illustrated position in which the lug 9''' is held by the pallet of the lever 29.

If the cassette 1''' is replaced with a cassette (1') which does not have an index or marker 2''', closing of the door 13'''; does not result in any pivoting of the lever 6''', i.e., this lever maintains its arm 7''' at a level below the marker 2''', as viewed in FIG. 5. Therefore, the lug 9''' is remote from the path of movement of the portion 32 and cannot be reached by the portion 32 when the member 31 is moved from the broken-line to the solid-line position of FIG. 5. Therefore, pivoting of the lever 27 by the door 13''' to the position of FIG. 5 is to no avail, i.e., the pallet of the lever 29 cannot engage the lug 9'''. In the just described angular position (i.e., in the absence of a marker on the cassette which is properly inserted into the camera of FIG. 5), a grey filter is free to move behind the picture taking lens. Such grey filter may be mounted in the same way as the filter 26 of FIG. 4, i.e., its carrier can be permanently biased to a position in which the filter is located behind the lens but the carrier can move to such position only when the spring 8''' maintains the lever 6''' in that angular position in which the lug 9''' is remote from the path of movement of the portion 32. Alternatively, the carrier for the filter can be coupled to the lever 6''' in such a way that the filter is held out of register with the lens when the lever 6''' assumes the position of FIG. 5 but the filter is automatically placed behind the lens when the lug 9''' is remote from the path of movement of portion 32 of the member 31.

The camera of FIG. 5 differs from the cameras of FIGS. 1-4 in that the disengagement of scanning lever 6''' from the marker 2''' does not take place in direct response to movement of the door 13''' to the closed position. Instead, the door 13''' must be closed and the user must carry out an additional operation, namely, the user must move the member 31, either for the purpose of cocking the shutter, for the purpose of advancing the film, or for the purpose of actuating the camera release. This enables or causes the portion 32 to move the lug 9''' into the range of the lever 29 which thereupon holds the arm 7''' away from the marker 2'''. The lever 29 is automatically disengaged from the lug 9''' when the door 13''' is returned to the open position because the spring 28 is free to pivot the lever 27 and the latter pivots the lever 29 anticlockwise, as viewed in FIG. 5.

In each of the illustrated embodiments, the means for disengaging the scanning lever from the marker of a properly inserted container or cassette for a particular type of film (namely, a film which is identified by the marker 2, 2'' or 2''') comprises at least one member which is movable from a first to a second position in order to bring about a disengagement of the arm 7, 7', 7'' or 7''' from the marker. In the embodiments of FIGS. 1–4, the disengaging means comprises two movable members, namely, the members 10A, 13 and the similarly numbered members shown in FIGS. 3 and 4. In the embodiment of FIG. 5, the disengaging means comprises basically the member 31 because the members 27, 29 actually perform the function of holding the scanning lever 6''' in the disengaged position subsequent to (a) closing of the door 13''' and (b) movement of the member 31 from the broken-line to the solid-line position.

Without further analysis, the foregoing will so fully reveal the gist of the present invention that others can, by applying current knowledge, readily adapt it for various applications without omitting features that, from the standpoint of prior art, fairly constitute essential charateristics of the generic and specific aspects of my contribution to the art and, therefore, such adaptations should and are intended to be comprehended within the meaning and range of equivalence of the claims.

What is claimed is:

1. In a photographic apparatus for use with film containers having markers denoting a characteristic of the film therein, the combination of a housing including a first section having a chamber for film containers and a second section movable between operative and inoperative positions; mobile scanning means mounted in said housing and located in the path of movement of a marker during insertion of the respective container into said chamber so that said scanning means is moved by and bears against the marker in response to insertion of such container; and means for disengaging said scanning means from the marker in a container in said chamber and for maintaining said scanning means out of contact with the marker during exposure of film in the container which is confined in said chamber, including a first member movable relative to said second section between first and second positions, a displaceable second member mounted in said first section and located in the path of and being displaced by said second section during movement to said operative position, and a third member movable by said second member to an operative position in response to displacement of said second member by said second section, said scanning means being located in the path of movement of one of said members and being disengaged from the marker in said chamber, moved into engagement with and held by another of said members during movement of said first member from said first to said second position.

2. The combination of claim 1, wherein said second section constitutes a closure for said chamber and is movable between closed and open positions, said one member being said first member and said scanning means being moved into engagement with and held by said third member during movement of said first member from said first to said second position.

3. The combination of claim 1, wherein said characteristic is the sensitivity of film and further comprising means for biasing said scanning means against the marker during insertion of the respective container into said chamber.

4. The combination of claim 1, wherein said first mentioned member constitutes a shutter actuating means.

5. The combination of claim 1, wherein said first mentioned member forms part of film transporting means.

6. The combination of claim 1, wherein said scanning means is remote from the path of movement of said first mentioned member when the container in said chamber is devoid of a marker.

7. The combination of claim 1, wherein said scanning means includes a spring-biased lever.

* * * * *